United States Patent
Lee et al.

(10) Patent No.: US 10,033,449 B2
(45) Date of Patent: Jul. 24, 2018

(54) METHOD FOR RECEIVING REFERENCE SIGNAL IN WIRELESS COMMUNICATION SYSTEM, AND APPARATUS THEREFOR

(71) Applicant: LG ELECTRONICS INC., Seoul (KR)

(72) Inventors: Hyunho Lee, Seoul (KR); Hanjun Park, Seoul (KR); Jonghyun Park, Seoul (KR); Hyukjin Chae, Seoul (KR); Youngtae Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/534,278

(22) PCT Filed: Dec. 11, 2015

(86) PCT No.: PCT/KR2015/013560
§ 371 (c)(1),
(2) Date: Jun. 8, 2017

(87) PCT Pub. No.: WO2016/099079
PCT Pub. Date: Jun. 23, 2016

(65) Prior Publication Data
US 2017/0366244 A1    Dec. 21, 2017

Related U.S. Application Data

(60) Provisional application No. 62/092,813, filed on Dec. 16, 2014, provisional application No. 62/109,647, filed on Jan. 30, 2015.

(51) Int. Cl.
*H04B 7/06* (2006.01)
*H04W 24/10* (2009.01)
(Continued)

(52) U.S. Cl.
CPC .......... *H04B 7/0619* (2013.01); *H04B 17/24* (2015.01); *H04W 24/10* (2013.01); *H04B 7/0417* (2013.01)

(58) Field of Classification Search
CPC ....... H04W 4/02; H04W 24/10; H04W 64/00; H04W 64/003; H04W 7/0619; H04L 5/00;
(Continued)

(56) References Cited

U.S. PATENT DOCUMENTS

2013/0329772 A1   12/2013   Wernersson et al.
2013/0336224 A1*  12/2013   Davydov ............... H04W 4/02
                                                    370/328
(Continued)

FOREIGN PATENT DOCUMENTS

WO    2012121774 A2    9/2012
WO    2014193068 A1   12/2014

*Primary Examiner* — Thanh Le
(74) *Attorney, Agent, or Firm* — Dentons US LLP

(57) ABSTRACT

A method for receiving a reference signal for position determination in a wireless communication system according to one embodiment of the present invention may comprise the steps of: receiving configuration information regarding a positioning reference signal (PRS), the method thereof being performed by user equipment (UE) and that is transmitted from a plurality of antenna ports, wherein the PRS related configuration information includes information regarding a beam direction applied to the PRS; measuring each PRS group to which the same beam direction related information is applied; and reporting the measurement results of the respective PRS group to a serving base station.

16 Claims, 9 Drawing Sheets

(51) Int. Cl.
*H04B 17/24* (2015.01)
*H04B 7/0417* (2017.01)

(58) Field of Classification Search
CPC ........... H04L 27/26; H04B 7/04; H04B 17/24; H04B 7/06
See application file for complete search history.

(56) References Cited

U.S. PATENT DOCUMENTS

2014/0112261 A1 4/2014 Chen et al.
2014/0148198 A1 5/2014 Siomina et al.
2017/0142682 A1* 5/2017 Gunnarsson ........ H04W 64/003
2017/0285627 A1* 10/2017 Feldmann ............ H04B 7/1851

* cited by examiner

METHOD FOR RECEIVING REFERENCE SIGNAL IN WIRELESS COMMUNICATION SYSTEM, AND APPARATUS THEREFOR

This application is a 35 USC § 371 National Stage entry of International Application No. PCT/KR2015/013560, filed on Dec. 11, 2015, and claims priority to U.S. Provisional Application No. 62/092,813, filed Dec. 16, 2014, and U.S. Provisional Application No. 62/109,647, filed Jan. 30, 2015 all of which are incorporated by reference in their entirety herein.

TECHNICAL FIELD

The present invention relates to a wireless communication system, and more particularly, to a method for receiving a reference signal in a wireless communication system and an apparatus therefor.

BACKGROUND ART

Recently, various devices requiring machine-to-machine (M2M) communication and high data transfer rate, such as smartphones or tablet personal computers (PCs), have appeared and come into widespread use. This has rapidly increased the quantity of data which needs to be processed in a cellular network. In order to satisfy such rapidly increasing data throughput, recently, carrier aggregation (CA) technology which efficiently uses more frequency bands, cognitive ratio technology, multiple antenna (MIMO) technology for increasing data capacity in a restricted frequency, multiple-base-station cooperative technology, etc. have been highlighted. In addition, communication environments have evolved such that the density of accessible nodes is increased in the vicinity of a user equipment (UE). Here, the node includes one or more antennas and refers to a fixed point capable of transmitting/receiving radio frequency (RF) signals to/from the user equipment (UE). A communication system including high-density nodes may provide a communication service of higher performance to the UE by cooperation between nodes.

A multi-node coordinated communication scheme in which a plurality of nodes communicates with a user equipment (UE) using the same time-frequency resources has much higher data throughput than legacy communication scheme in which each node operates as an independent base station (BS) to communicate with the UE without cooperation.

A multi-node system performs coordinated communication using a plurality of nodes, each of which operates as a base station or an access point, an antenna, an antenna group, a remote radio head (RRH), and a remote radio unit (RRU). Unlike the conventional centralized antenna system in which antennas are concentrated at a base station (BS), nodes are spaced apart from each other by a predetermined distance or more in the multi-node system. The nodes can be managed by one or more base stations or base station controllers which control operations of the nodes or schedule data transmitted/received through the nodes. Each node is connected to a base station or a base station controller which manages the node through a cable or a dedicated line.

The multi-node system can be considered as a kind of Multiple Input Multiple Output (MIMO) system since dispersed nodes can communicate with a single UE or multiple UEs by simultaneously transmitting/receiving different data streams. However, since the multi-node system transmits signals using the dispersed nodes, a transmission area covered by each antenna is reduced compared to antennas included in the conventional centralized antenna system. Accordingly, transmit power required for each antenna to transmit a signal in the multi-node system can be reduced compared to the conventional centralized antenna system using MIMO. In addition, a transmission distance between an antenna and a UE is reduced to decrease in pathloss and enable rapid data transmission in the multi-node system. This can improve transmission capacity and power efficiency of a cellular system and meet communication performance having relatively uniform quality regardless of UE locations in a cell. Further, the multi-node system reduces signal loss generated during transmission since base station(s) or base station controller(s) connected to a plurality of nodes transmit/receive data in cooperation with each other. When nodes spaced apart by over a predetermined distance perform coordinated communication with a UE, correlation and interference between antennas are reduced. Therefore, a high signal to interference-plus-noise ratio (SINR) can be obtained according to the multi-node coordinated communication scheme.

Owing to the above-mentioned advantages of the multi-node system, the multi-node system is used with or replaces the conventional centralized antenna system to become a new foundation of cellular communication in order to reduce base station cost and backhaul network maintenance cost while extending service coverage and improving channel capacity and SINR in next-generation mobile communication systems.

DISCLOSURE

Technical Problem

An object of the present invention is to provide a method for receiving a reference signal in a wireless communication system and an operation related therewith.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

In a method for receiving a positioning reference signal in a wireless communication system according to one embodiment of the present invention, the method is performed by a UE and comprises receiving positioning reference signal (PRS) related configuration information transmitted from a plurality of antenna ports, the PRS related configuration information including beam direction related information applied to the PRS; measuring PRS groups per PRS group, each PRS group including at least one PRS to which the same beam direction related information is applied; and reporting the measurement result of each PRS group to a serving base station.

Additionally or alternatively, the beam direction related information may indicate information on a beam direction applied to PRS transmitted from at least one subframe included in PRS positioning occasion indicated by the PRS related configuration information.

Additionally or alternatively, the beam direction related information may indicate information on a beam direction applied to each PRS positioning occasion indicated by the PRS related configuration information.

Additionally or alternatively, the beam direction related information may indicate information on a beam direction applied to each symbol to which PRS sequence included in the PRS positioning occasion indicated by the PRS related configuration information is mapped.

Additionally or alternatively, the method may further comprise the step of reporting, to the serving base station, a measurement result that includes information on a resource in which PRS estimated as the best beam direction is received.

Additionally or alternatively, the PRS may be received in such a manner that a plurality of precoding matrixes are applied thereto for a first time duration, and may be received in such a manner that one precoding matrix is applied thereto or no precoding matrix is applied thereto for a second time duration.

Additionally or alternatively, one precoding matrix applied for the second time duration may be determined depending on information on the resource in which PRS estimated as the best beam direction and reported by the terminal is received.

Additionally or alternatively, the second time duration may be shifted to the first time duration if the measurement result of the PRS by the terminal is an expected value or less.

A terminal configured to receive a positioning reference signal in a wireless communication system comprises a radio frequency (RF) unit; and a processor controls the RF unit, wherein the processor receives positioning reference signal (PRS) related configuration information transmitted from a plurality of antenna ports, the PRS related configuration information including beam direction related information applied to the PRS, measures PRS groups per PRS group, each PRS group including at least one PRS to which the same beam direction related information is applied, and reports the measurement result of each PRS group to a serving base station.

Additionally or alternatively, the beam direction related information may indicate information on a beam direction applied to PRS transmitted from at least one subframe included in PRS positioning occasion indicated by the PRS related configuration information.

Additionally or alternatively, the beam direction related information may indicate information on a beam direction applied to each PRS positioning occasion indicated by the PRS related configuration information.

Additionally or alternatively, the beam direction related information may indicate information on a beam direction applied to each symbol to which PRS sequence included in the PRS positioning occasion indicated by the PRS related configuration information is mapped.

Additionally or alternatively, the processor may be configured to report, to the serving base station, a measurement result that includes information on a resource in which PRS estimated as the best beam direction is received.

Additionally or alternatively, the PRS may be received in such a manner that a plurality of precoding matrixes are applied thereto for a first time duration, and may be received in such a manner that one precoding matrix is applied thereto or no precoding matrix is applied thereto for a second time duration.

Additionally or alternatively, one precoding matrix applied for the second time duration may be determined depending on information on the resource in which PRS estimated as the best beam direction and reported by the terminal is received.

Additionally or alternatively, the second time duration may be shifted to the first time duration if the measurement result of the PRS by the terminal is an expected value or less.

The above technical solutions are merely some parts of the embodiments of the present invention and various embodiments into which the technical features of the present invention are incorporated can be derived and understood by persons skilled in the art from the following detailed description of the present invention.

Advantageous Effects

According to one embodiment of the present invention, reception of a reference signal and measurement of the reference signal can efficiently be performed in a wireless communication system.

It will be appreciated by persons skilled in the art that that the effects that can be achieved through the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE FOR CARRYING OUT THE INVENTION

Figure 1:
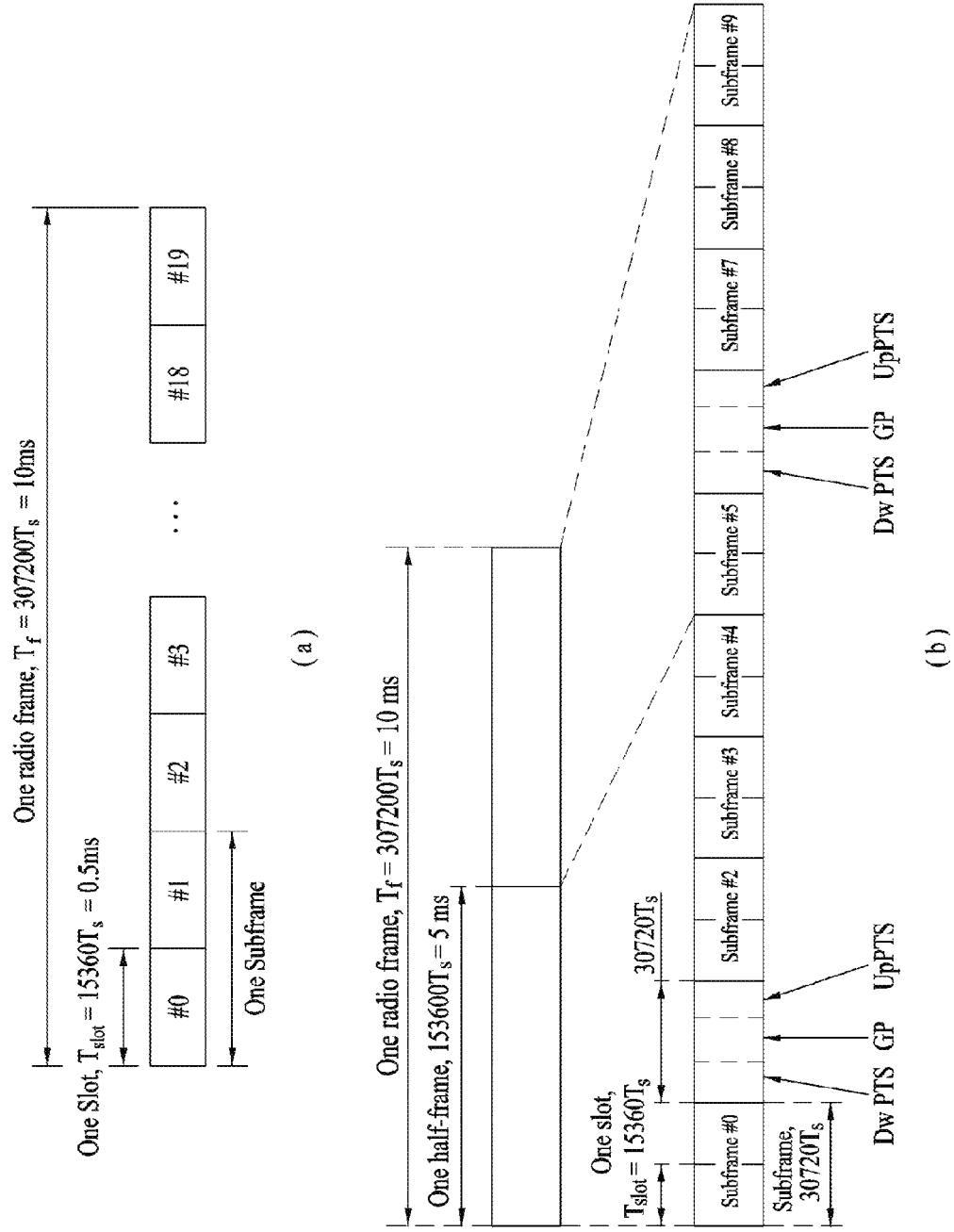
FIG. 1 is diagram illustrating an example of a radio frame structure used in a wireless communication system.

Reference will now be made in detail to the preferred embodiments of the present invention, examples of which are illustrated in the accompanying drawings. The accompanying drawings illustrate exemplary embodiments of the present invention and provide a more detailed description of the present invention. However, the scope of the present invention should not be limited thereto.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term 'BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present invention, a node refers to a fixed point capable of transmitting/receiving a radio signal to/from a UE by communication with the UE. Various eNBs can be used as nodes. For example, a node can be a BS, NB, eNB, pico-cell eNB (PeNB), home eNB (HeNB), relay, repeater, etc. Furthermore, a node may not be an eNB. For example, a node can be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB can be smoothly performed compared to cooperative communication according to eNBs connected through a wireless link. At least one antenna is installed per node. An antenna may refer to an antenna port, a virtual antenna or an antenna group. A node may also be called a point. Unlike a conventional centralized antenna system (CAS) (i.e. single node system) in which antennas are concentrated in an eNB and controlled an eNB controller, plural nodes are spaced apart at a predetermined distance or longer in a multi-node system. The plural nodes can be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system can be regarded as a multi-cell (e.g., macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming). DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming). DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

In the present invention, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE. In 3GPP LTE-A systems, a UE can measure downlink channel state from a specific node using one or more CSI-RSs (Channel State Information Reference Signals) transmitted through antenna port(s) of the specific node on a CSI-RS resource allocated to the specific node. In general, neighboring nodes transmit CSI-RS resources on orthogonal CSI-RS resources. When CSI-RS resources are orthogonal, this means that the CSI-RS resources have different subframe configurations and/or CSI-RS sequences which specify subframes to which CSI-RSs are allocated according to CSI-RS resource configurations, subframe offsets and transmission periods, etc. which specify symbols and subcarriers carrying the CSI RSs.

In the present invention, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowledgement/Negative ACK)/downlink data. In addition, PUCCH (Physical Uplink Control Channel)/PUSCH (Physical Uplink Shared Channel)/PRACH (Physical Random Access Channel) refer to sets of time-frequency resources or resource elements respectively carrying UCI (Uplink Control Information)/uplink data/random access signals. In the present invention, a time-frequency resource or a resource element (RE), which is allocated to or belongs to PDCCH/PCFICH/PHICH/PDSCH/PUCCH/PUSCH/PRACH, is referred to as a PDCCH/PCFICH/PHICH/PDSCH/PUCCH/PUSCH/PRACH RE or PDCCH/PCFICH/PHICH/PDSCH/PUCCH/PUSCH/PRACH resource. In the following description, transmission of PUCCH/PUSCH/PRACH by a UE is equivalent to transmission of uplink control information/uplink data/random access signal through or on PUCCH/PUSCH/PRACH. Furthermore, transmission of PDCCH/PCFICH/PHICH/PDSCH by an eNB is equivalent to transmission of downlink data/control information through or on PDCCH/PCFICH/PHICH/PDSCH.

FIG. 1 illustrates an exemplary radio frame structure used in a wireless communication system. FIG. 1(a) illustrates a frame structure for frequency division duplex (FDD) used in 3GPP LTE/LTE-A and FIG. 1(b) illustrates a frame structure for time division duplex (TDD) used in 3GPP LTE/LTE-A.

Referring to FIG. 1, a radio frame used in 3GPP LTE/LTE-A has a length of 10 ms (307200 Ts) and includes 10 subframes in equal size. The 10 subframes in the radio frame may be numbered. Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows special subframe configuration.

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |

TABLE 2-continued

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 8 | 24144 · $T_s$ | — | — | — | — | — |
| 9 | 13168 · $T_s$ | — | — | — | — | — |

Figure 2:
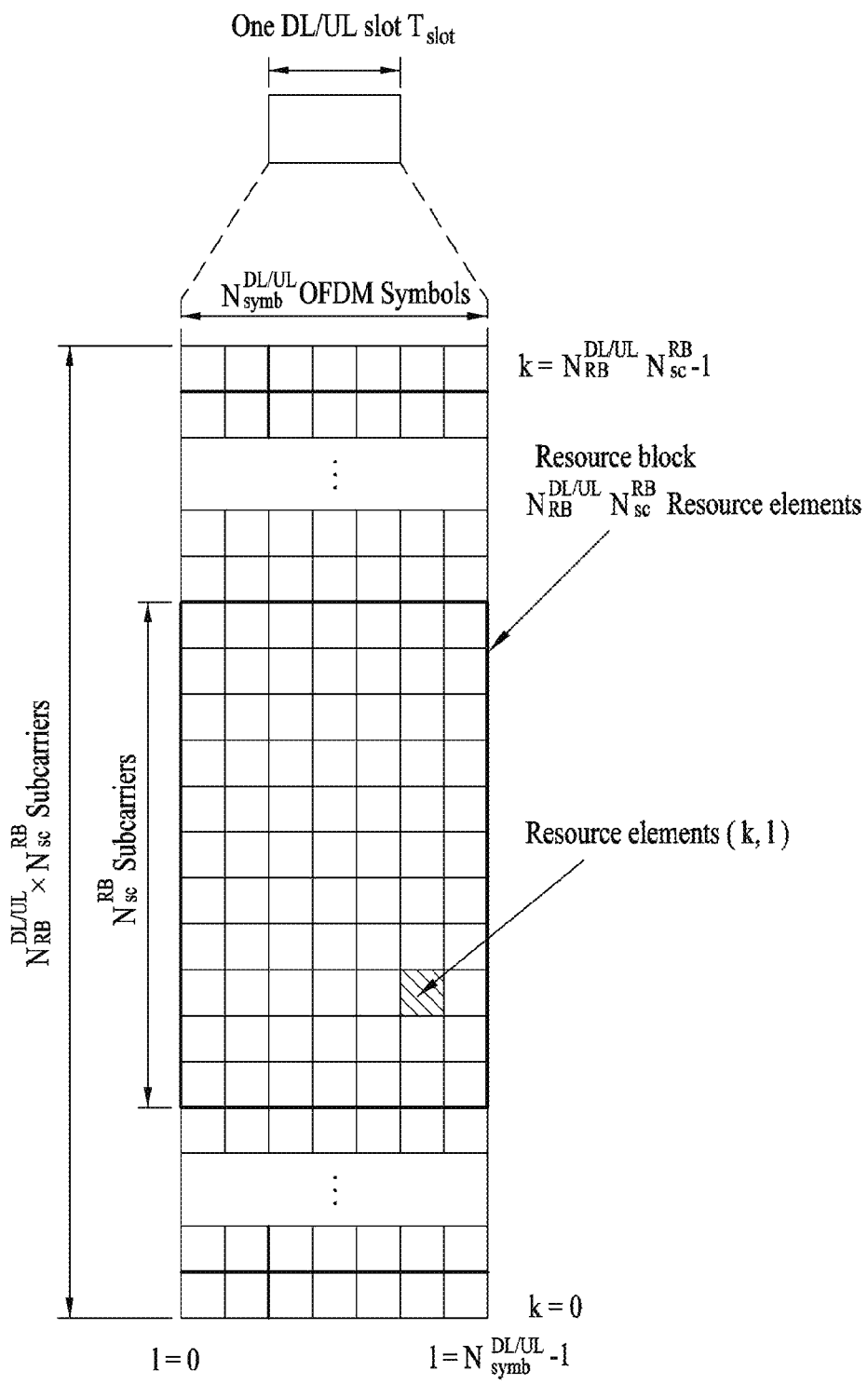
FIG. 2 is diagram illustrating an example of a downlink/uplink (DL/UL) slot structure in a wireless communication system.

FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL/UL} * N_{sc}^{RB}$ subcarriers and $N_{symb}^{DL/UL}$ OFDM symbols. Here, $N_{RB}^{DL}$ denotes the number of RBs in a downlink slot and $N_{RB}^{UL}$ denotes the number of RBs in an uplink slot. $N_{RB}^{DL}$ and $N_{RB}^{UL}$ respectively depend on a DL transmission bandwidth and a UL transmission bandwidth. $N_{symb}^{DL}$ denotes the number of OFDM symbols in the downlink slot and $N_{symb}^{UL}$ denotes the number of OFDM symbols in the uplink slot. In addition, $N_{sc}^{RB}$ denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present invention can be equally applied to subframes having different numbers of OFDM symbols. Referring to FIG. 2, each OFDM symbol includes $N_{RB}^{DL/UL} * N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL/UL}$ (e.g., 7) consecutive OFDM symbols in the time domain and $N_{sc}^{RB}$ (e.g., 12) consecutive subcarriers in the frequency domain. For reference, a resource composed by an OFDM symbol and a subcarrier is called a resource element (RE) or a tone. Accordingly, an RB is composed of $N_{symb}^{DL/UL} * N_{sc}^{RB}$ REs. Each RE in a resource grid can be uniquely defined by an index pair (k, l) in a slot. Here, k is an index in the range of 0 to $N_{symb}^{DL/UL} * N_{sc}^{RB} - 1$ in the frequency domain and l is an index in the range of 0 to $N_{symb}^{DL/UL} - 1$.

Two RBs that occupy $N_{sc}^{RB}$ consecutive subcarriers in a subframe and respectively disposed in two slots of the subframe are called a physical resource block (PRB) pair. Two RBs constituting a PRB pair have the same PRB number (or PRB index). A virtual resource block (VRB) is a logical resource allocation unit for resource allocation. The VRB has the same size as that of the PRB. The VRB may be divided into a localized VRB and a distributed VRB depending on a mapping scheme of VRB into PRB. The localized VRBs are mapped into the PRBs, whereby VRB number (VRB index) corresponds to PRB number. That is, nPRB=nVRB is obtained. Numbers are given to the localized VRBs from 0 to $N_{VRB}^{DL}-1$, and $N_{VRB}^{DL}=N_{RB}^{DL}$ is obtained. Accordingly, according to the localized mapping scheme, the VRBs having the same VRB number are mapped into the PRBs having the same PRB number at the first slot and the second slot. On the other hand, the distributed VRBs are mapped into the PRBs through interleaving. Accordingly, the VRBs having the same VRB number may be mapped into the PRBs having different PRB numbers at the first slot and the second slot. Two PRBs, which are respectively located at two slots of the subframe and have the same VRB number, will be referred to as a pair of VRBs.

Figure 3:
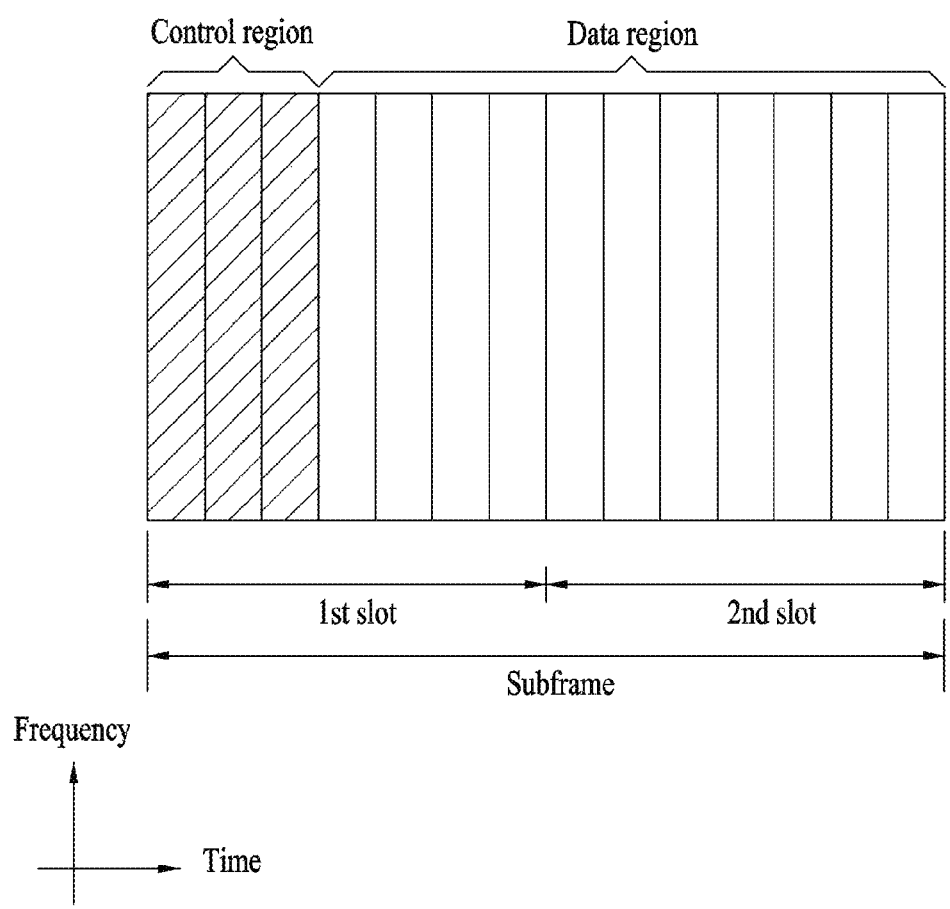
FIG. 3 is diagram illustrating an example of a downlink (DL) subframe structure used in a 3GPP LTE/LTE-A system.

FIG. 3 illustrates a downlink (DL) subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for uplink and formats 1, 1A, 1B, 1C, 1D, 2, 2A, 2B, 2C, 3 and 3A for downlink, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

In general, a DCI format for a UE depends on transmission mode (TM) set for the UE. In other words, only a DCI format corresponding to a specific TM can be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). For example, a CCE corresponds to 9 REGs and an REG corresponds to 4 REs. 3GPP LTE defines a CCE set in which a PDCCH can be located for each UE. A CCE set from which a UE can detect a PDCCH thereof is called a PDCCH search space, simply, search space. An individual resource through which the PDCCH can be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. Aggregation levels defining the search space is as follows.

TABLE 3

| Search Space | | | Number of PDCCH |
|---|---|---|---|
| Type | Aggregation Level L | Size [in CCEs] | candidates $M^{(L)}$ |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

A PDCCH candidate corresponds to 1, 2, 4 or 8 CCEs according to CCE aggregation level. An eNB transmits a PDCCH (DCI) on an arbitrary PDCCH candidate with in a search space and a UE monitors the search space to detect the PDCCH (DCI). Here, monitoring refers to attempting to decode each PDCCH in the corresponding search space according to all monitored DCI formats. The UE can detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB can transmit data for a UE or a UE group through the data region. Data transmitted through the data region may be called user data. For transmission of the user data, a physical downlink shared channel (PDSCH) may be allocated to the data region. A paging channel (PCH) and downlink-shared channel (DL-SCH) are transmitted through the PDSCH. The UE can read data transmitted through the PDSCH by decoding control information transmitted through a PDCCH. Information representing a UE or a UE group to which data on the PDSCH is transmitted, how the UE or UE group receives and decodes the PDSCH data, etc. is included in the PDCCH and transmitted. For example, if a specific PDCCH is CRC (cyclic redundancy check)-masked having radio network temporary identify (RNTI) of "A" and information about data transmitted using a radio resource (e.g., frequency position) of "B" and transmission format information (e.g., transport block size, modulation scheme, coding information, etc.) of "C" is transmitted through a specific DL subframe, the UE monitors PDCCHs using RNTI information and a UE having the RNTI of "A" detects a PDCCH and receives a PDSCH indicated by "B" and "C" using information about the PDCCH.

A reference signal (RS) to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot. Reference signals are categorized into a cell-specific RS shared by all UEs in a cell and a modulation RS (DM RS) dedicated for a specific UE. A DM RS transmitted by the eNB for demodulation of downlink data for a specific UE is called a UE-specific RS. Both or one of DM RS and CRS may be transmitted on downlink. When only the DM RS is transmitted without CRS, an RS for channel measurement needs to be additionally provided because the DM RS transmitted using the same precoder as used for data can be used for demodulation only. For example, in 3GPP LTE(-A), CSI-RS corresponding to an additional RS for measurement is transmitted to the UE such that the UE can measure channel state information. CSI-RS is transmitted in each transmission period corresponding to a plurality of subframes based on the fact that channel state variation with time is not large, unlike CRS transmitted per subframe.

Figure 4:
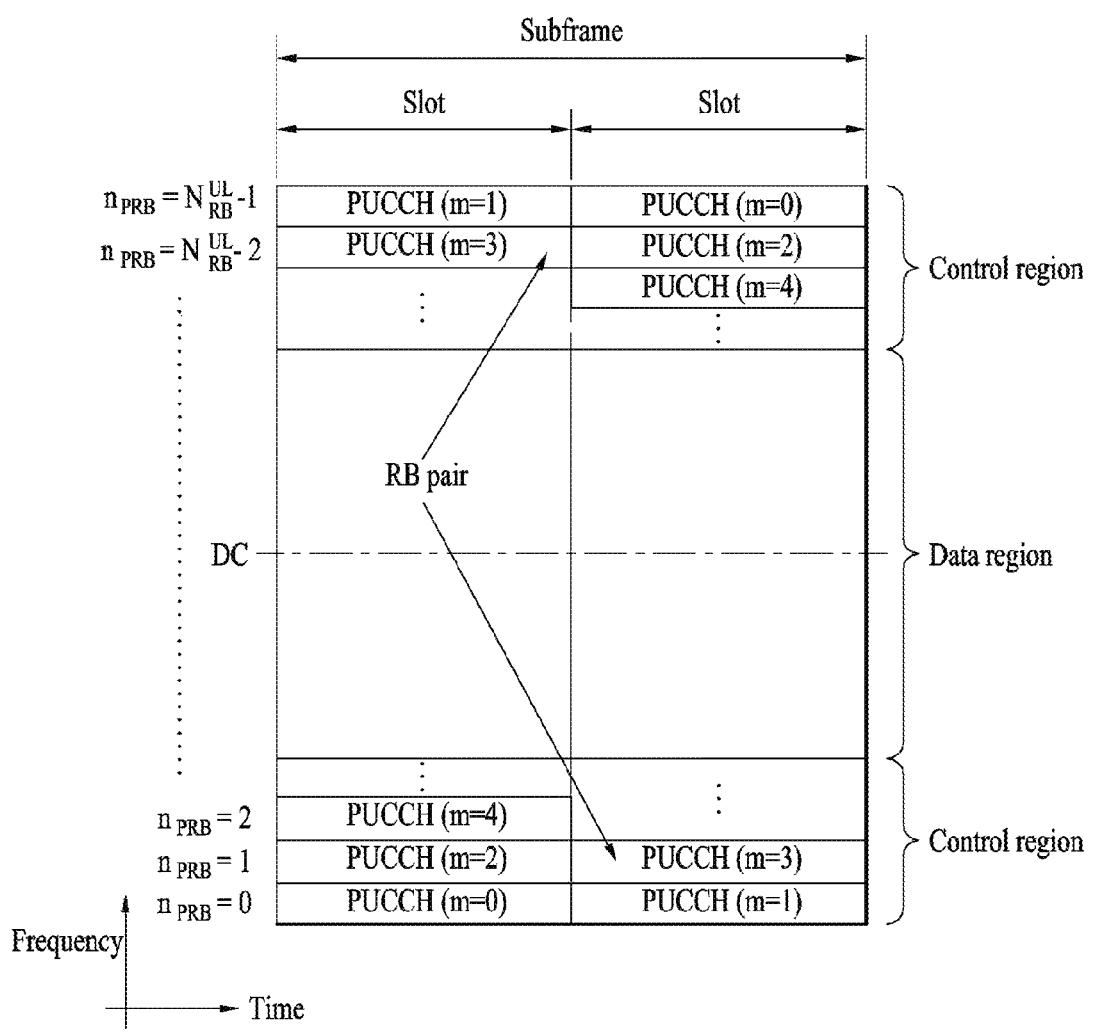
FIG. 4 is diagram illustrating an example of an uplink (UL) subframe structure used in a 3GPP LTE/LTE-A system.

FIG. 4 illustrates an exemplary uplink subframe structure used in 3GPP LTE/LTE-A.

Referring to FIG. 4, a UL subframe can be divided into a control region and a data region in the frequency domain. One or more PUCCHs (physical uplink control channels) can be allocated to the control region to carry uplink control information (UCI). One or more PUSCHs (Physical uplink shared channels) may be allocated to the data region of the UL subframe to carry user data.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH can be used to transmit the following control information.

Scheduling Request (SR): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. HARQ-ACK responses include positive ACK (ACK), negative ACK (NACK), discontinuous transmission (DTX) and NACK/DTX. Here, the term HARQ-ACK is used interchangeably with the term HARQ ACK/NACK and ACK/NACK.

Channel State Indicator (CSI): This is feedback information about a downlink channel. Feedback information regarding MIMO includes a rank indicator (RI) and a precoding matrix indicator (PMI).

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon.

Table 4 shows the mapping relationship between PUCCH formats and UCI in LTE/LTE-A.

TABLE 4

| PUCCH format | Modulation scheme | Number of bits per subframe, $M_{bit}$ | Usage | Etc. |
| --- | --- | --- | --- | --- |
| 1 | N/A | N/A | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |

TABLE 4-continued

| PUCCH format | Modulation scheme | Number of bits per subframe, $M_{bit}$ | Usage | Etc. |
| --- | --- | --- | --- | --- |
| 3 | QPSK | 48 | ACK/NACK or SR + ACK/NACK or CQI/PMI/RI + ACK/NACK | |

Referring to Table 4, PUCCH formats 1/1a/1b are used to transmit ACK/NACK information, PUCCH format 2/2a/2b are used to carry CSI such as CQI/PMI/RI and PUCCH format 3 is used to transmit ACK/NACK information.

Generally, in a cellular communication system, various methods for acquiring position information of a UE in a network are used. Representatively, a positioning scheme based on OTDOA (observed time difference of arrival) exists in the LTE system. According to the positioning scheme, the UE may be configured to receive PRS (positioning reference signal) transmission related information of eNBs from a higher layer signal, and may transmit a reference signal time difference (RSTD) which is a difference between a reception time of a PRS transmitted from a reference eNB and a reception time of a PRS transmitted from a neighboring eNB to a eNB or network by measuring PRS transmitted from cells in the periphery of the UE, and the network calculates a position of the UE by using RSTD and other information. In addition, other schemes such as an A-GNSS (Assisted Global Navigation Satellite System) positioning scheme, an E-CID (Enhanced Cell-ID) scheme, and a UTDOA (Uplink Time Difference of Arrival) exist, and various location-based services (for example, advertisements, position tracking, emergency communication means, etc.) may be used based on these positioning schemes.

[LTE Positioning Protocol]

In the LTE system, an LPP (LTE positioning protocol) has been defined to the OTDOA scheme, and notifies the UE of OTDOA-ProvideAssistanceData having the following configuration through IE (information element).

```
-- ASN1START
OTDOA-ProvideAssistanceData ::= SEQUENCE {
  otdoa-ReferenceCellInfo OTDOA-ReferenceCellInfo OPTIONAL, --
Need ON
  otdoa-NeighbourCellInfo OTDOA-NeighbourCellInfoList OPTIONAL,
-- Need ON
  otdoa-Error OTDOA-Error OPTIONAL, -- Need ON
  ...
}
-- ASN1STOP
```

In this case, OTDOA-ReferenceCellInfo means a cell which is a reference of RSTD measurement, and is configured as follows.

```
-- ASN1START
OTDOA-ReferenceCellInfo ::= SEQUENCE {
  physCellId INTEGER (0 . . . 503),
  cellGlobalId ECGI OPTIONAL, -- Need ON
  earfcnRef ARFCN-ValueEUTRA OPTIONAL, --Cond
```

-continued

```
NotSameAsServ0
  antennaPortConfig ENUMERATED {ports1-or-2, ports4, ... }
  OPTIONAL, -- Cond NotSameAsServ1
  cpLength ENUMERATED { normal, extended, ... },
  prsInfo PRS-Info OPTIONAL, -- Cond PRS
  ...,
  [[ earfcnRef-v9a0 ARFCN-ValueEUTRA-v9a0 OPTIONAL -- Cond
NotSameAsServ2
  ]]
}
-- ASN1STOP
```

Meanwhile, OTDOA-NeighbourCellInfo means cells (for example, eNB or TP) which is a target for RSTD measurement, and may include information on maximum 24 neighboring cells per frequency layer with respect to maximum three frequency layers. That is, OTDOA-NeighbourCellInfo may notify the UE of information on a total of 3*24=72 cells.

```
-- ASN1START
OTDOA-NeighbourCellInfoList ::= SEQUENCE (SIZE
(1 ... maxFreqLayers)) OF OTDOA-NeighbourFreqInfo
  OTDOA-NeighbourFreqInfo ::= SEQUENCE (SIZE (1 ... 24)) OF
OTDOA-NeighbourCellInfoElement
  OTDOA-NeighbourCellInfoElement ::= SEQUENCE {
  physCellId INTEGER (0 ... 503),
  cellGlobalId ECGI OPTIONAL, -- Need ON
  earfcn ARFCN-ValueEUTRA OPTIONAL, -- Cond
NotSameAsRef0
  cpLength ENUMERATED {normal, extended, ... }
  OPTIONAL, -- Cond NotSameAsRef1
  prsInfo PRS-Info OPTIONAL, -- Cond
NotSameAsRef2
  antennaPortConfig ENUMERATED {ports-1-or-2, ports-4, ... }
  OPTIONAL, -- Cond NotsameAsRef3
  slotNumberOffset INTEGER (0 ... 19) OPTIONAL, -- Cond
NotSameAsRef4
  prs-SubframeOffset INTEGER (0 ... 1279) OPTIONAL, -- Cond
InterFreq
  expectedRSTD INTEGER (0 ... 16383),
  expectedRSTD-Uncertainty INTEGER (0 ... 1023),
  ...,
  [[ earfcn-v9a0 ARFCN-ValueEUTRA-v9a0 OPTIONAL -- Cond
NotSameAsRef5
  ]]
}
  maxFreqLayers INTEGER ::= 3
-- ASN1STOP
```

In this case, PRS-Info which is IE included in OTDOA-ReferenceCellInfo and OTDOA-NeighbourCellInfo has PRS information, and is specifically configured, as follows, as PRS Bandwidth, PRS Configuration Index (IPRS), Number of Consecutive Downlink Subframes, and PRS Muting Information.

```
PRS-Info ::= SEQUENCE {
prs-Bandwidth ENUMERATED { n6, n15, n25, n50, n75, n100, ... },
prs-ConfigurationIndex INTEGER (0 ... 4095),
numDL-Frames ENUMERATED {sf-1, sf-2, sf-4, sf-6, ... },
...,
prs-MutingInfo-r9 CHOICE {
po2-r9 BIT STRING (SIZE(2)),
po4-r9 BIT STRING (SIZE(4)),
po8-r9 BIT STRING (SIZE(8)),
po16-r9 BIT STRING (SIZE(16)),
...
} OPTIONAL -- Need OP
}
-- ASN1STOP
```

Figure 5:
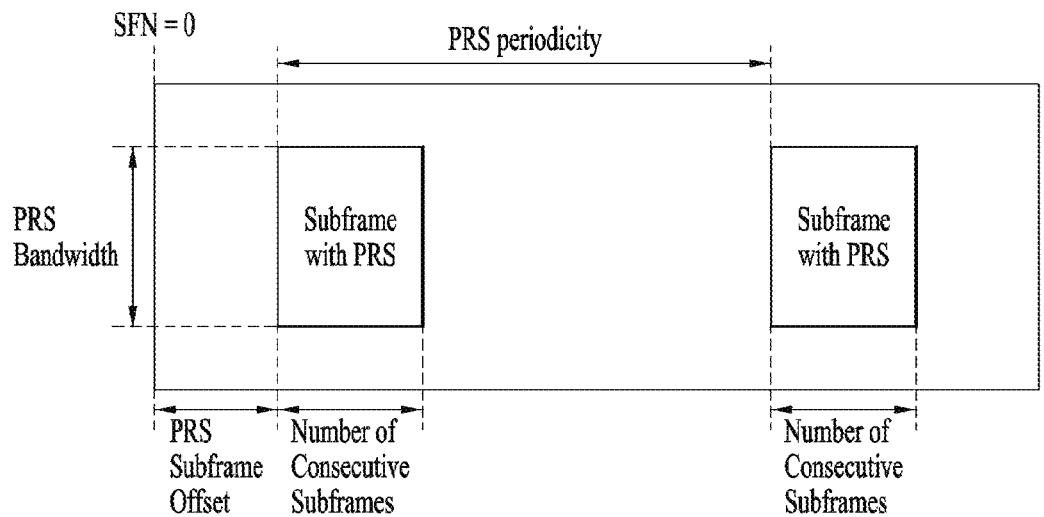
FIG. 5 is a diagram illustrating a PRS transmission structure.

FIG. 5 illustrates a PRS transmission structure according to the above parameters.

At this time, PRS Periodicity and PRS Subframe Offset are determined in accordance with a value of PRS Configuration Index (IPRS), and their correlation is as follows.

TABLE 5

| PRS Configuration Index ($I_{PRS}$) | PRS Periodicity (subframes) | PRS Subframe Offset (subframes) |
|---|---|---|
| 0-159 | 160 | $I_{PRS}$ |
| 160-479 | 320 | $I_{PRS}$-160 |
| 480-1119 | 640 | $I_{PRS}$-480 |
| 1120-23399 | 1280 | $I_{PRS}$-1120 |

[PRS(Positioning Reference Signal)]

Figure 6:
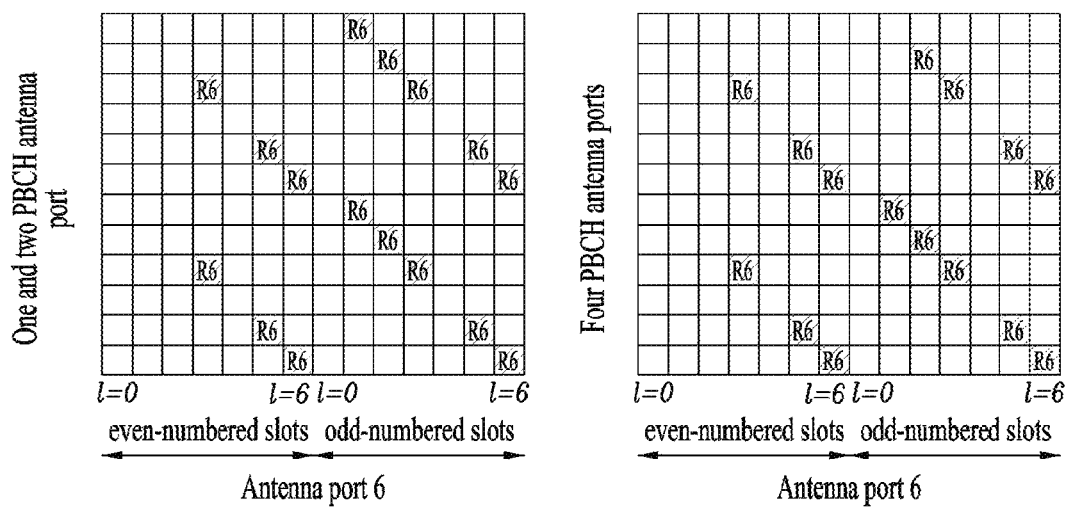
FIGS. 6 and 7 are diagrams illustrating RE mapping a PRS (positioning reference signal)
Figure 7:
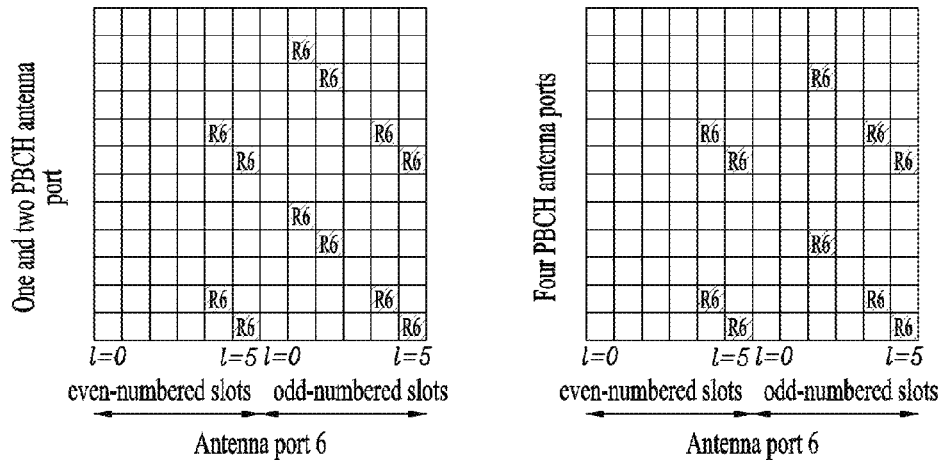

The PRS has a transmission occasion, that is, a positioning occasion at a period of 160, 320, 640, or 1280 ms, and may be transmitted for N DL subframes consecutive for the positioning occasion. In this case, N may have a value of 1, 2, 4 or 6. Although the PRS may be transmitted substantially at the positioning occasion, the PRS may be muted for inter-cell interference control cooperation. Information on such PRS muting is signaled to the UE as prs-MutingInfo. A transmission bandwidth of the PRS may be configured independently unlike a system bandwidth of a serving eNB, and is transmitted to a frequency band of 6, 15, 25, 50, 75 or 100 resource blocks (RBs). Transmission sequences of the PRS are generated by initializing a pseudo-random sequence generator for every OFDM symbol using a function of a slot index, an OFDM symbol index, a cyclic prefix (CP) type, and a cell ID. The generated transmission sequences of the PRS are mapped to resource elements (REs) depending on a normal CP or an extended CP as shown in FIG. 6 (normal CP) and FIG. 7 (extended CP). A position of the mapped REs may be shifted on the frequency axis, and a shift value is determined by a cell ID. The positions of the REs for transmission of the PRS shown in FIGS. 6 and 7 correspond to the case that the frequency shift is 0.

The UE receives designated configuration information on a list of PRSs to be searched from a position management server of a network to measure PRSs. The corresponding information includes PRS configuration information of a reference cell and PRS configuration information of neighboring cells. The configuration information of each PRS includes a generation cycle and offset of a positioning occasion, and the number of continuous DL subframes constituting one positioning occasion, cell ID used for generation of PRS sequences, a CP type, the number of CRS antenna ports considered at the time of PRS mapping, etc. In addition, the PRS configuration information of the neighboring cells includes a slot offset and a subframe offset of the neighboring cells and the reference cell, an expected RSTD, and a level of uncertainty of the expected RSTD to support determination of the UE when the UE determines a timing point and a level of time window used to search for the PRS to detect the PRS transmitted from the neighboring cell.

Meanwhile, the RSTD refers to a relative timing difference between an adjacent or neighboring cell j and a reference cell i. In other words, the RSTD may be expressed by $T_{subframeRxj} - T_{subframeRxi}$, wherein $T_{subframeRxj}$ refers to a timing point at which a UE starts to receive a specific subframe from the neighboring cell j, and $T_{subframeRxi}$ refers to a timing point at which a UE starts to receive a subframe, which is closest to the specific subframe received from the neighboring cell j in terms of time and corresponds to the specific subframe, from the reference cell i. A reference point for an observed subframe time difference is an antenna connector of the UE.

Although the aforementioned positioning schemes of the related art are already supported by the 3GPP UTRA and E-UTRAN standard (for example, (LTE Rel-9), higher accuracy is recently required for an in-building positioning scheme. That is, although the positioning schemes of the related art may commonly be applied to outdoor/indoor environments, in case of E-CID scheme, general positioning accuracy is known as 150 m in a non-LOS (NLOS) environment and as 50 m in a LOS environment. Also, the OTDOA scheme based on the PRS has a limit in a positioning error, which may exceed 100 m, due to an eNB synchronization error, a multipath propagation error, a quantization error in RSTD measurement of a UE, and a timing offset estimation error. Also, since a GNSS receiver is required in case of the A-GNSS scheme, the A-GNSS scheme has a limit in complexity and battery consumption, and has a restriction in using in-building positioning.

In this specification, a cellular network basically transmits a specific pilot signal (for example, specific reference signal type identifiable separately per eNB/TP (transmission point)) to the UE, and the UE calculates a positioning related estimation value (for example, OTDOA and RSTD estimation value) based on a specific positioning scheme by measuring each pilot signal and then reports the calculated value to the eNB, whereby a method for calculating position information of the corresponding UE at a eNB terminal is considered.

An evolved wireless communication system considers the introduction of an active antenna system (AAS). Since the AAS supports electronic beam control per antenna, the AAS enables enhanced MIMO capable of forming an accurate beam pattern or a 3D beam pattern in consideration of beam direction and beam width. Massive MIMO having a plurality of input/output antennas and a multi-dimensional antenna structure is also considered owing to the introduction of an enhanced antenna system such as AAS. For example, when a two-dimensional antenna array is formed, distinguished from a conventional linear type antenna array (or a one-dimensional antenna array), a 3-dimensional beam pattern may be formed by an active antenna of the AAS.

Figure 8:
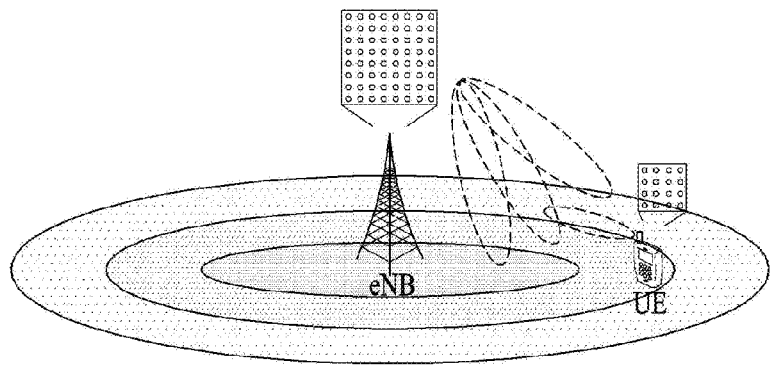
FIG. 8 is a diagram illustrating a large scaled MIMO (multiple input multiple output) wireless communication system according to the present invention.

When the 3D beam pattern is used in view of Tx antennas, quasi-static or dynamic beamforming may be performed not only in the horizontal beam direction but also in the vertical beam direction, and application such as vertical-direction sector forming may be considered. In view of Rx antennas, when Rx beams are formed using a massive Rx antenna, increase in signal power based on an antenna array gain may be expected. Accordingly, in case of uplink, the eNB may receive signals transmitted from the UE, through multiple antennas. In this case, the UE may configure Tx power thereof to a very low level in consideration of a gain of the massive Rx antenna to reduce the influence of interference. FIG. 8 illustrates the above example, and illustrates a system in which an eNB or UE has a plurality of Tx/Rx antennas that enable AAS based 3D beamforming.

This specification suggests a signal transmission method of an eNB and a measurement and report method of a UE when it is intended to obtain enhancement of positioning performance by using 3D beam pattern forming of an evolved eNB that may support an antenna array such as AAS. Although suggestions and detailed examples in this specification have been described based on the conventional PRS, a separate RS having no relation with the conventional PRS may be defined to support the operations of the present invention, or another conventional RS may be used.

If a 3D MIMO system that supports an evolved antenna array such as AAS is considered as shown in FIG. 8, in PRS transmission of the eNB, a 3D beam pattern may be formed and then transmitted. The present invention suggests an operation of an eNB that notifies the UE of information on beam transmission and an operation of the eNB that performs independent measurement for each beam direction and reports the measured result when beams are transmitted by being changed using a specific antenna virtualization matrix or precoding matrix in PRS transmission within a positioning occasion.

For example, if the eNB intends to improve estimation accuracy of a vertical domain during position information estimation of the UE, the eNB may transmit PRS by changing vertical beams. If the eNB transmits the PRS by changing the vertical beams, the eNB may 1) change the beam per subframe or antenna port within the positioning occasion, or may 2) transmit the PRS by setting a specific beam direction unique to each positioning occasion. If mapping is performed between signals of M PRS antenna ports and N antenna elements through the antenna virtualization matrix and the precoding matrix, the signals at the antenna terminal are given by $Y=APX=B\text{diag}\{x_1, \ldots, x_M\}$, wherein X means a signal of a PRS port, and B means N-by-matrix to which an antenna virtualization matrix A and a precoding matrix P are applied.

Figure 9:
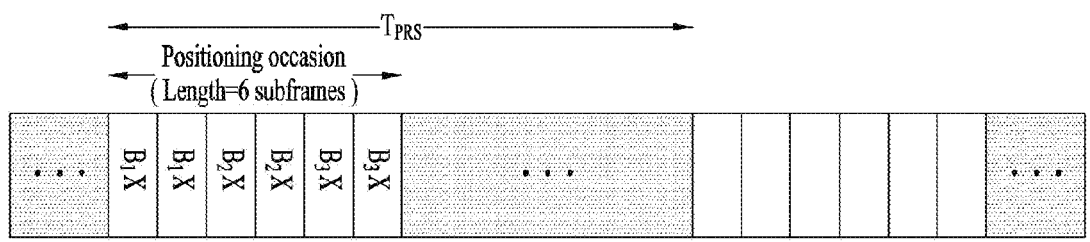
FIG. 9 is a diagram illustrating PRS transmission according to one embodiment of the present invention.

FIG. 9 illustrates an example of PRS transmission in which a beam direction is changed within one positioning occasion. The eNB transmits the PRS while changing the beam direction using $B_1$, $B_2$, $B_3$ within the positioning occasion. If the UE configured by PRS configuration combines positioning related measurement results for all PRSs within the positioning occasion and reports the combined result, the eNB fails to obtain the effect of PRS transmission by changing the beam direction. Therefore, the eNB provides the UE with an identifier, which may identify a beam direction per subframe within the positioning occasion, through a higher layer signal. For example, information such as "prs-BeamPattern" may be included in the aforementioned PRS-Info element, and its format may be defined in various manners as follows.

prs-BeamPattern ENUMERATED {bp-1, bp-2, bp-3, bp-4, . . . },
   This information means a type of a beam pattern at each subframe within the positioning occasion. As an example, this information corresponds to "bp-1, bp-1, bp-2, bp-2, bp-3, bp-3" in FIG. 9.

prs-BeamPattern INTEGER {1,2,3,4,5,6, . . . },
   This information means the number of subframes for maintaining the beam pattern, and corresponds to "2" in FIG. 9.

Or, this information means mapping index of PRS port and beam pattern.

etc.

The UE combines only positioning related measurement results of subframes corresponding to the beam direction identified based on the above information and reports the combined result. That is, the UE combines PRS measurement results per same beam direction and reports the combined result. For example, referring to FIG. 9, the UE combines measurement results of the first and second subframes corresponding to beam $B_1$ and reports the combined result, combines measurement results of the third and fourth subframes corresponding to beam $B_2$ and reports the combined result, and combines measurement results of the fifth and sixth subframes corresponding to beam $B_3$ and reports the combined result.

If there is no information such as prs-BeamPattern within PRS-Info, the UE combines positioning related measurement results from PRSs within one or a plurality of positioning occasions like the conventional case and reports the combined result.

Figure 10:
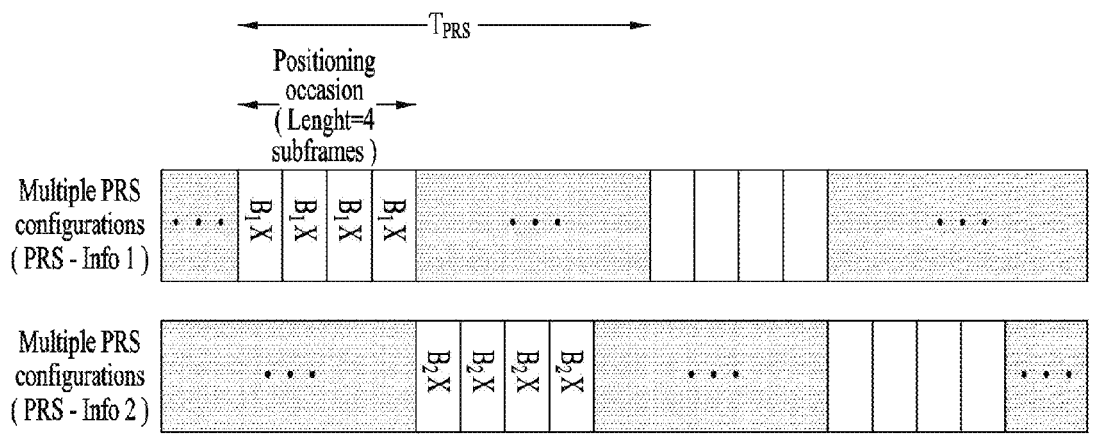
FIG. 10 is a diagram illustrating PRS transmission according to one embodiment of the present invention.

On the other hand, FIG. 10 illustrates an example of transmission of PRS having a specific beam direction unique to each of a plurality of positioning occasions. The eNB configures a plurality of PRS-Info, and transmits PRS having a beam direction corresponding to each of the plurality of PRS-Info. In this case, the eNB configures a plurality of PRS-Info for prsInfo within OTDOA-ReferenceCellInfo (or OTDOA-NeighbourCellInfoElement) and provides the UE of the configured PRS-Info through a higher layer signal. The followings illustrates an example of the higher layer signal which is added.

```
-- ASN1START
OTDOA-ReferenceCellInfo ::= SEQUENCE {
physCellId INTEGER (0 . . . 503),
cellGlobalId ECGI OPTIONAL, -- Need ON
earfcnRef ARFCN-ValueEUTRA OPTIONAL, -- Cond
NotSameAsServ0
  antennaPortConfig ENUMERATED {ports1-or-2, ports4, . . . }
  OPTIONAL, -- Cond NotSameAsServ1
  cpLength ENUMERATED { normal, extended, . . . },
  prsInfoSEQUENCE (SIZE (1 . . . maxBeamPattern)) OF PRS-Info
OPTIONAL, -- Cond PRS
  . . . ,
  [[ earfcnRef-v9a0 ARFCN-ValueEUTRA-v9a0 OPTIONAL --
Cond NotSameAsServ2
  ]]
}
-- ASN1STOP
-- ASN1START
OTDOA-NeighbourCellInfoList ::= SEQUENCE (SIZE
(1 . . . maxFreqLayers)) OF OTDOA-NeighbourFreqInfo
OTDOA-NeighbourFreqInfo ::= SEQUENCE (SIZE (1 . . . 24)) OF
OTDOA-NeighbourCellInfoElement
  OTDOA-NeighbourCellInfoElement ::= SEQUENCE {
  physCellId INTEGER (0 . . . 503),
  cellGlobalId ECGI OPTIONAL, -- Need ON
  earfcn ARFCN-ValueEUTRA OPTIONAL, -- Cond
NotSameAsRef0
  cpLength ENUMERATED {normal, extended, . . . }
  OPTIONAL, -- Cond NotSameAsRef1
  prsInfoSEQUENCE (SIZE (1 . . . maxBeamPattern)) OF PRS-Info
OPTIONAL, -- Cond NotSameAsRef2
  antennaPortConfig ENUMERATED {ports-1-or-2, ports-4, . . . }
  OPTIONAL, -- Cond NotsameAsRef3
  slotNumberOffset INTEGER (0 . . . 19) OPTIONAL, --
Cond NotSameAsRef4
  prs-SubframeOffset INTEGER (0 . . . 1279) OPTIONAL, -- Cond
InterFreq
  expectedRSTD INTEGER (0 . . . 16383),
  expectedRSTD-Uncertainty INTEGER (0 . . . 1023),
  . . . ,
  [[earfcn-v9a0 ARFCN-ValueEUTRA-v9a0 OPTIONAL --
Cond NotSameAsRef5
  ]]
}
maxFreqLayers INTEGER ::= 3
-- ASN1STOP
```

The UE combines only positioning related measurement results estimated from PRS corresponding to PRS-Info within one OTDOA-ReferenceCellInfo and PRS corresponding to PRS-Info within one NeighbourCellInfoElement and reports the combined result. For example, if two PRS-Info are configured from each of a reference cell and a neighbor cell, for convenience, PRS-Info of the reference cell will be referred to as PRS-Info 1 and PRS-Info2, and PRS-Info of the neighbor cell will be referred to as PRS-Info3 and PRS-Info4. The UE combines positioning related measurement results from each PRS-Info of the two cells and reports a total of four estimated values for (PRS-Info1, PRS-Info3), (PRS-Info1, PRS-Info4), (PRS-Info2, PRS-Info3), (PRS-Info2, PRS-Info4) and may also report index information of PRS-Info used by the estimated values.

The eNB configures one PRS-Info for the UE like the conventional case, and transmits PRS having a specific beam direction for a given time. At this time, the eNB may provide the UE of information on a time duration for maintaining the beam direction or transmit PRS while maintaining a specific beam direction for a predefined time duration.

Figure 11:
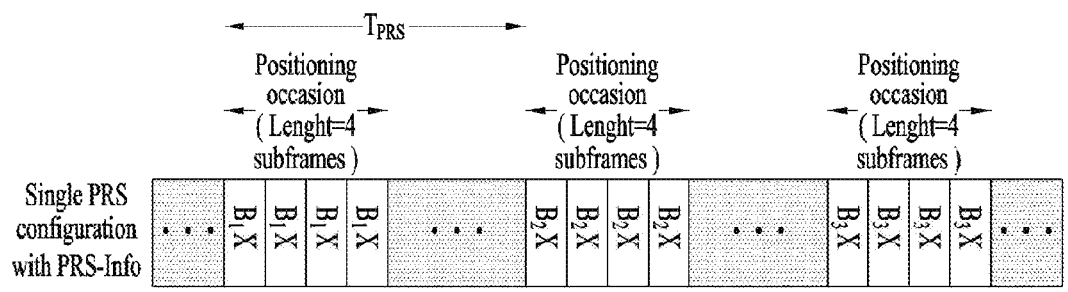
FIG. 11 is a diagram illustrating PRS transmission according to one embodiment of the present invention.
Figure 12:
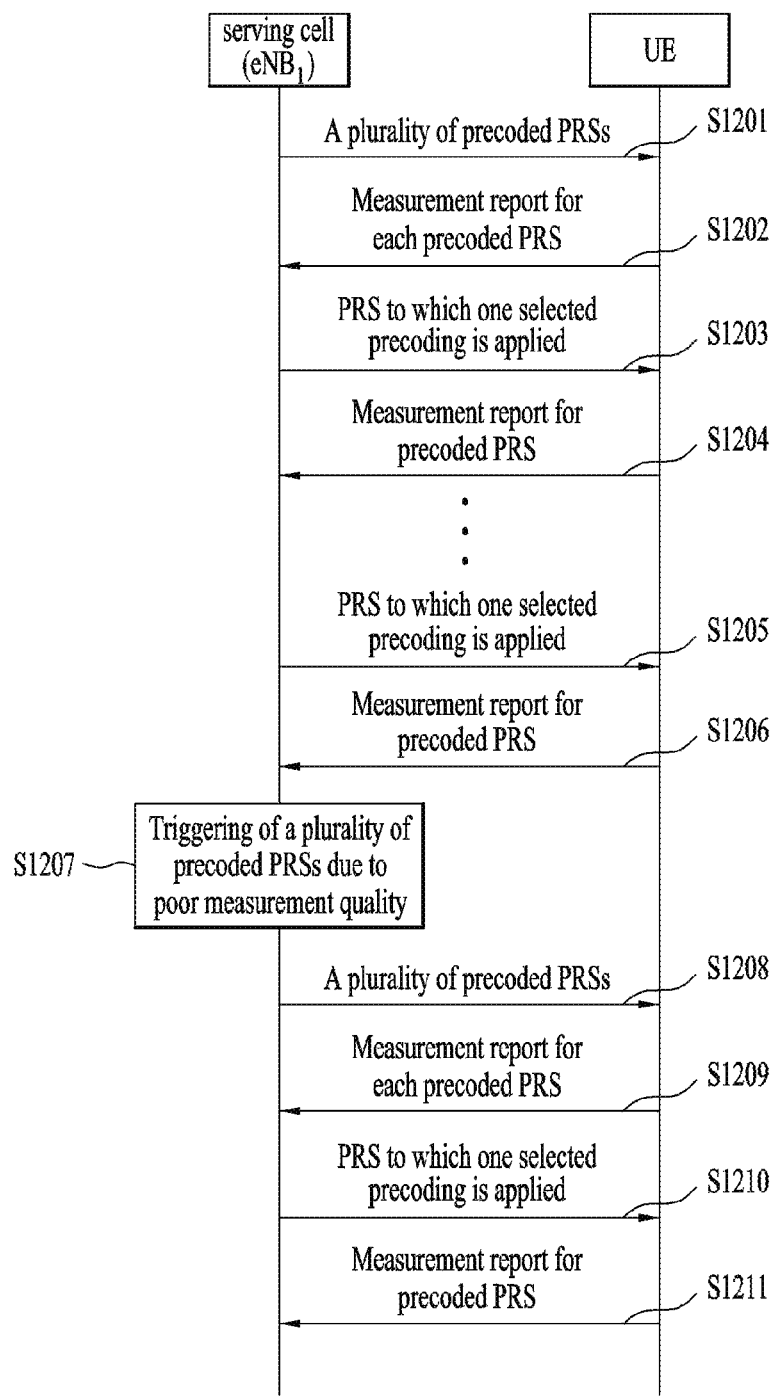
FIG. 12 is a diagram illustrating a procedure of PRS transmission and reception according to one embodiment of the present invention.

The UE measures PRSs received for a given time duration, combines the measured results, and reports the combined result. FIG. 11 illustrates an example of transmitting PRS while maintaining a specific beam direction for one positioning occasion. Therefore, the UE may combine PRS measurement values measured at each positioning occasion and then report the combined result to the eNB.

The eNB which is reported the plurality of positioning related measurement results for each beam direction as suggested above may select a value predicted as a more detailed measurement result or allocate a weight value differently depending on accuracy/reliability of each measurement result and combine the weight values to be used for position estimation of the UE. The eNB may transmit the PRS by using a beam direction reported by the UE as having high accuracy/reliability. If quality of the measurement result of the UE is less than an expected value or reliability thereof is excessively reduced, the eNB may again transmit the PRS by using a plurality of beams and then may be reported a measurement result from the UE.

That is, the eNB may configure a plurality of PRS-Info and transmit a plurality of precoded PRSs while changing a beam direction for a given time duration (S1201), and may be reported a measurement result for each PRS (S1202). The eNB may use a beam of one direction for another time duration or transmit PRS of one direction without specific precoding (S1203, S1205), and may be reported a measurement result for each PRS (S1204, S1206).

Then, if quality of the reported result is less than an expected value, transmission of a plurality of precoded PRSs is triggered (S1207). Therefore, the eNB again transmits the plurality of precoded PRSs (S1208), and the aforementioned steps S1201 to S1206 are repeated.

The eNB may transmit PRSs, which are previously scheduled, for a specific time duration identified from the above time duration. For example, the eNB may transmit a plurality of precoded PRSs for first three positioning occasions while changing a beam direction, and may use a beam of one direction for next seven positioning occasions or transmit PRS of one direction without specific precoding. Alternatively, the eNB may indicate identification of the time duration to the UE through a higher layer signal or dynamic signal, or may configure an initialization seed for PRS sequence differently per time duration.

The above-described embodiments of the present invention may be applied to the case that beam is differently applied to each of PRS symbols. In PRS transmission of the eNB, if the eNB transmits PRSs having different beam directions in a unit of 'single/plural subframes within positioning occasion', 'positioning occasion' or 'PRS symbol', the UE performs independent measurement corresponding to each beam direction and reports each measurement result for some or all of beams.

Alternatively, the UE may report measurement for PRS resource regarded as the best beam after performing measurement. In this case, an example of the best beam may mean PRS resource (subframe/positioning occasion/symbol) to which the same beam having maximum SINR or maximum received power is applied when different beams are applied in a unit of 'single/plural subframes within positioning occasion', 'positioning occasion' or 'PRS symbol'.

Alternatively, when the eNB configures and transmits PRS having various beam directions to the UE, the eNB may be configured to report a measurement result for N beams. (In this case, N=1, . . . , the number of maximum beam directions.)

In the above-described embodiments, the UE performs independent measurement for each beam direction and reports the measurement result. At this time, the UE also reports an estimated value such as power of signals received from a reference cell and a neighbor cell or signal strength quality in addition to RSTD which is an estimated value related to positioning and RSTD quality. The eNB may use the additional information on each beam direction for position estimation of the UE, whereby positioning enhancement may be expected.

In PRS transmission of the eNB, when the eNB transmits PRS by forming a 3D beam pattern and is reported positioning measurement for each beam direction, the eNB may estimate a brief position of the UE on the basis of this information. Therefore, the eNB may use this information for data communication with the UE to assist reliability enhancement. In more detail, based on the positioning measurement report of the UE, which is obtained by 3D beam pattern formed in PRS transmission, the eNB may restrict a subset for a codebook to use only specific beam directions that may enhance reliability during CSI-RS and/or data transmission. The eNB may reduce CSI-RS transmission overhead by transmitting CSI-RS using only precoding vectors (or matrixes) within the restricted codebook subset.

The above method may cause unsuitable subset restriction unsuitable for a current channel status if a channel status is rapidly changed or poor at a certain level or less, whereby throughput may be deteriorated. Therefore, to minimize such a side effect, the UE may determine a time variable level of the channel status or quality of the current channel status and report, to the eNB, whether the UE is in a stable channel status. The eNB may determine whether to apply subset restriction to the UE by using the reported information and transmit CSI-RS.

Figure 13:
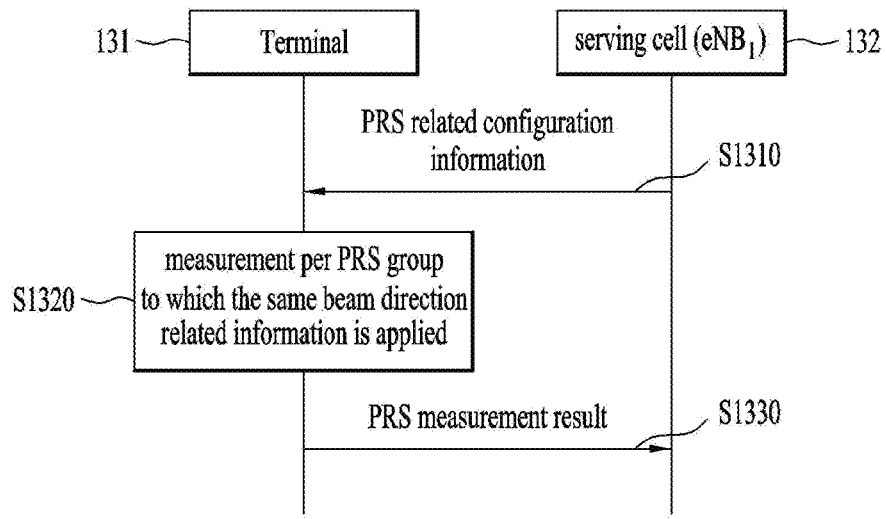
FIG. 13 is a diagram illustrating an operation according to one embodiment of the present invention.

FIG. 13 is a diagram illustrating an operation according to one embodiment of the present invention.

FIG. 13 relates to a method for receiving a reference signal for positioning in a wireless communication system.

A UE 131 may receive PRS (positioning reference signal) related configuration information transmitted from a plurality of antenna ports from a serving cell 132 (S1310). The PRS related configuration information may include beam direction related information applied to the PRS. The UE may perform measurement per PRS group to which the same beam direction related information is applied (S1320). Then, the UE may report the measurement result of each PRS group to the serving eNB.

The beam direction related information may indicate information on a beam direction applied to PRS transmitted from at least one subframe included in the PRS positioning occasion indicated by the PRS related configuration information.

The beam direction related information may indicate information on a beam direction applied to each PRS positioning occasion indicated by the PRS related configuration information.

Also, the beam direction related information may indicate information on a beam direction applied to each symbol to which PRS sequence included in the PRS positioning occasion indicated by the PRS related configuration information is mapped.

The UE may report, to the eNB, the measurement result that includes information on a resource in which PRS estimated as the best beam direction is received.

The PRS may be received in such a manner that a plurality of precoding matrixes are applied thereto for a first time duration, and may be received in such a manner that one precoding matrix is applied thereto or no precoding matrix is applied thereto for a second time duration.

One precoding matrix applied for the second time duration may be determined depending on information on the resource in which PRS estimated as the best beam direction and reported by the UE is received.

Also, if the PRS measurement result by the UE is an expected value or less, the second time duration may be shifted to the first time duration.

Although the embodiments according to the present invention have been described as above with reference to FIG. 13, the embodiment related to FIG. 13 may include at least a part of the aforementioned embodiment(s) alternatively or additionally.

Figure 14:
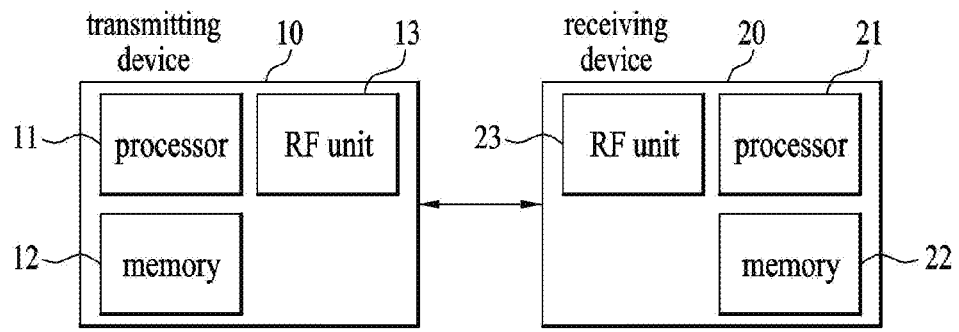
FIG. 14 is a block diagram illustrating an apparatus for implementing the embodiment(s) of the present invention.

FIG. 14 is a block diagram illustrating a transmitter 10 and a receiver 20 configured to implement embodiments of the present invention. Each of the transmitter 10 and receiver 20 includes a radio frequency (RF) unit 13, 23 capable of transmitting or receiving a radio signal that carries information and/or data, a signal, a message, etc., a memory 12, 22 configured to store various kinds of information related to communication with a wireless communication system, and a processor 11, 21 operatively connected to elements such as the RF unit 13, 23 and the memory 12, 22 to control the memory 12, 22 and/or the RF unit 13, 23 to allow the device to implement at least one of the embodiments of the present invention described above.

The memory 12, 22 may store a program for processing and controlling the processor 11, 21, and temporarily store input/output information. The memory 12, 22 may also be utilized as a buffer. The processor 11, 21 controls overall operations of various modules in the transmitter or the receiver. Particularly, the processor 11, 21 may perform various control functions for implementation of the present invention. The processors 11 and 21 may be referred to as controllers, microcontrollers, microprocessors, microcomputers, or the like. The processors 11 and 21 may be achieved by hardware, firmware, software, or a combination thereof. In a hardware configuration for an embodiment of the present invention, the processor 11, 21 may be provided with application specific integrated circuits (ASICs) or digital signal processors (DSPs), digital signal processing devices (DSPDs), programmable logic devices (PLDs), and field programmable gate arrays (FPGAs) that are configured to implement the present invention. In the case which the present invention is implemented using firmware or software, the firmware or software may be provided with a module, a procedure, a function, or the like which performs the functions or operations of the present invention. The firmware or software configured to implement the present invention may be provided in the processor 11, 21 or stored in the memory 12, 22 to be driven by the processor 11, 21.

The processor 11 of the transmitter 10 performs predetermined coding and modulation of a signal and/or data scheduled by the processor 11 or a scheduler connected to the processor 11, and then transmits a signal and/or data to the RF unit 13. For example, the processor 11 converts a data sequence to be transmitted into K layers through demultiplexing and channel coding, scrambling, and modulation. The coded data sequence is referred to as a codeword, and is equivalent to a transport block which is a data block provided by the MAC layer. One transport block is coded as one codeword, and each codeword is transmitted to the receiver in the form of one or more layers. To perform frequency-up transformation, the RF unit 13 may include an oscillator. The RF unit 13 may include Nt transmit antennas (wherein Nt is a positive integer greater than or equal to 1).

The signal processing procedure in the receiver 20 is configured as a reverse procedure of the signal processing procedure in the transmitter 10. The RF unit 23 of the receiver 20 receives a radio signal transmitted from the transmitter 10 under control of the processor 21. The RF unit 23 may include Nr receive antennas, and retrieves baseband signals by frequency down-converting the signals received through the receive antennas. The RF unit 23 may include an oscillator to perform frequency down-converting. The processor 21 may perform decoding and demodulation on the radio signal received through the receive antennas, thereby retrieving data that the transmitter 10 has originally intended to transmit.

The RF unit 13, 23 includes one or more antennas. According to an embodiment of the present invention, the antennas function to transmit signals processed by the RF unit 13, 23 are to receive radio signals and deliver the same to the RF unit 13, 23. The antennas are also called antenna ports. Each antenna may correspond to one physical antenna or be configured by a combination of two or more physical antenna elements. A signal transmitted through each antenna cannot be decomposed by the receiver 20 anymore. A reference signal (RS) transmitted in accordance with a corresponding antenna defines an antenna from the perspective of the receiver 20, enables the receiver 20 to perform channel estimation on the antenna irrespective of whether the channel is a single radio channel from one physical antenna or a composite channel from a plurality of physical antenna elements including the antenna. That is, an antenna is defined such that a channel for delivering a symbol on the antenna is derived from a channel for delivering another symbol on the same antenna. An RF unit supporting the Multiple-Input Multiple-Output (MIMO) for transmitting and receiving data using a plurality of antennas may be connected to two or more antennas.

In embodiments of the present invention, the UE operates as the transmitter 10 on uplink, and operates as the receiver 20 on downlink. In embodiments of the present invention, the eNB operates as the receiver 20 on uplink, and operates as the transmitter 10 on downlink.

The transmitter and/or receiver may be implemented by one or more embodiments of the present invention among the embodiments described above.

Detailed descriptions of preferred embodiments of the present invention have been given to allow those skilled in the art to implement and practice the present invention. Although descriptions have been given of the preferred embodiments of the present invention, it will be apparent to those skilled in the art that various modifications and variations can be made in the present invention defined in the appended claims. Thus, the present invention is not intended to be limited to the embodiments described herein, but is intended to have the widest scope consistent with the principles and novel features disclosed herein.

INDUSTRIAL APPLICABILITY

The present invention is applicable to wireless communication devices such as a terminal, a relay, and a base station.

The invention claimed is:

1. A method for receiving a positioning reference signal (PRS) in a wireless communication system, the method performed by a terminal and comprising the steps of:
   receiving PRS related configuration information transmitted from a plurality of antenna ports, the PRS related configuration information including beam direction related information applied to the PRS;
   measuring PRS groups, each of the PRS groups including at least one PRS to which the same beam direction related information is applied; and
   reporting the measurement result of each of the PRS groups to a serving base station.

2. The method according to claim 1, wherein the beam direction related information indicates a beam direction applied to a PRS transmitted in at least one subframe included in a PRS positioning occasion indicated by the PRS related configuration information.

3. The method according to claim 1, wherein the beam direction related information indicates a beam direction applied to each of one or more PRS positioning occasions indicated by the PRS related configuration information.

4. The method according to claim 1, wherein the beam direction related information indicates a beam direction applied to each symbol to which a PRS sequence included in a PRS positioning occasion indicated by the PRS related configuration information is mapped.

5. The method according to claim 1, further comprising reporting, to the serving base station, a measurement result that includes information on a resource in which a PRS having the best beam direction is received.

6. The method according to claim 1, wherein the PRS is received in such a manner that a plurality of precoding matrixes are applied thereto for a first time duration, and is received in such a manner that one precoding matrix is applied thereto or no precoding matrix is applied thereto for a second time duration.

7. The method according to claim 6, wherein when one precoding matrix is applied for the second time duration, the one precoding matrix is determined depending on information on a resource in which a PRS having the best beam direction is received.

8. The method according to claim 6, wherein the second time duration is shifted to the first time duration when the measurement result of the PRS by the terminal is an expected value or less.

9. A terminal configured to receive a positioning reference signal (PRS) in a wireless communication system, the terminal comprising:
   a transmitter and receiver; and
   a processor,
   wherein the processor controls the receiver to receive PRS related configuration information transmitted from a plurality of antenna ports, the PRS related configuration information including beam direction related information applied to the PRS, measures PRS groups, each of the PRS groups including at least one PRS to which the same beam direction related information is applied, and controls the transmitter to transmit the measurement result of each of the PRS groups to a serving base station.

10. The terminal according to claim 9, wherein the beam direction related information indicates a beam direction applied to a PRS transmitted in at least one subframe included in a PRS positioning occasion indicated by the PRS related configuration information.

11. The terminal according to claim 9, wherein the beam direction related information indicates a beam direction applied to each of one or more PRS positioning occasions indicated by the PRS related configuration information.

12. The terminal according to claim 9, wherein the beam direction related information indicates a beam direction applied to each symbol to which a PRS sequence included in a PRS positioning occasion indicated by the PRS related configuration information is mapped.

13. The terminal according to claim 9, wherein the processor is configured to report, to the serving base station, a measurement result that includes information on a resource in which a PRS having the best beam direction is received.

14. The terminal according to claim 9, wherein the PRS is received in such a manner that a plurality of precoding matrixes are applied thereto for a first time duration, and is received in such a manner that one precoding matrix is applied thereto or no precoding matrix is applied thereto for a second time duration.

15. The terminal according to claim 14, wherein when one precoding matrix is applied to the PRS for the second time duration, the one precoding matrix is determined depending on information on a resource in which a PRS having the best beam direction is received.

16. The terminal according to claim 14, wherein the second time duration is shifted to the first time duration when the measurement result of the PRS by the terminal is an expected value or less.

* * * * *